US011297251B2

(12) United States Patent
Itoh

(10) Patent No.: US 11,297,251 B2
(45) Date of Patent: Apr. 5, 2022

(54) IMAGE CAPTURE APPARATUS HAVING FIRST AND SECOND AMPLIFICATION UNITS AND CONTROL METHOD FOR SAME

(71) Applicant: CANON KABUSHIKI KAISHA, Tokyo (JP)

(72) Inventor: Yasuhiro Itoh, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/936,165

(22) Filed: Jul. 22, 2020

(65) Prior Publication Data

US 2021/0029285 A1    Jan. 28, 2021

(30) Foreign Application Priority Data

Jul. 26, 2019   (JP) .............................. JP2019-137960

(51) Int. Cl.
*H04N 5/235*   (2006.01)

(52) U.S. Cl.
CPC ................................ *H04N 5/2352* (2013.01)

(58) Field of Classification Search
CPC . H04N 5/353–3537; H04N 5/235–243; H04N 5/378; H04N 5/3355; H04N 5/3745–37455; G03B 7/00–28; G03B 2207/00–005; H03M 1/00–645
USPC ......................................... 341/155–172, 139
See application file for complete search history.

(56) References Cited

U.S. PATENT DOCUMENTS

| | | | | |
|---|---|---|---|---|
| 2002/0057845 A1* | 5/2002 | Fossum | ................ | H04N 9/0451 382/270 |
| 2010/0177225 A1 | 7/2010 | Cieslinski | | |
| 2010/0309356 A1* | 12/2010 | Ihara | .................... | H04N 5/3742 348/300 |
| 2014/0118601 A1* | 5/2014 | Myung | .............. | H04N 5/23216 348/333.11 |

FOREIGN PATENT DOCUMENTS

JP    2016-129397 A    7/2016

* cited by examiner

*Primary Examiner* — Xi Wang
(74) *Attorney, Agent, or Firm* — Canon U.S.A., Inc. IP Division

(57) ABSTRACT

An image capture apparatus includes a photoelectric conversion unit, an acquisition unit, a first amplification unit, a second amplification unit, and an amplification factor control unit. The photoelectric conversion unit is configured to convert an optical image into an image signal. The acquisition unit is configured to acquire a value related to a correct exposure on a basis of the image signal converted from the optical image by the photoelectric conversion unit. The first amplification unit is configured to amplify the image signal with a first amplification factor. The second amplification unit is configured to amplify the image signal with a second amplification factor. The amplification factor control unit is configured to change the first amplification factor or the second amplification factor based on the value related to the correct exposure.

18 Claims, 8 Drawing Sheets

FIG.7

| | AVERAGE VALUE | – 100 | 101 – 150 | 151 – 200 | 201 – |
|---|---|---|---|---|---|
| 701 | | | | | |
| 702 | EV | 9 | 10 | 11 | 12 |
| 703 | AMPLIFICATION FACTOR | 8 | 4 | 2 | 1 |

700

IMAGE CAPTURE APPARATUS HAVING FIRST AND SECOND AMPLIFICATION UNITS AND CONTROL METHOD FOR SAME

BACKGROUND

Field

One disclosed aspect of the embodiments relates to an image capture apparatus and a control method for an image capture apparatus.

Description of the Related Art

It is important to improve a signal-to-noise (S/N) ratio of an image capture apparatus. A general image capture apparatus includes one amplification circuit for one photoelectric conversion element to amplify an electrical signal generated by the photoelectric conversion element. In this regard, to improve the S/N ratio, there is known an image capture apparatus that amplifies an electric signal generated by a photoelectric conversion element by two amplification circuits (see, for example, Japanese Patent Application Laid-Open No. 2016-129397 and United States Patent Application Publication No. 2010/0177225). Such an image capture apparatus selects either of two amplified electric signals based on a luminance and generates one image, and thereby can improve the S/N ratio.

However, in the techniques of Japanese Patent Application Laid-Open No. 2016-129397 and United States Patent Application Publication No. 2010/0177225, an amplification factor of the electric signal is preset before imaging. Thus, in a case where a luminance distribution changes rapidly, such as in outdoor imaging, if the preset amplification factor is used with the techniques of Japanese Patent Application Laid-Open No. 2016-129397 and United States Patent Application Publication No. 2010/0177225, there is an issue in that the effect of improving the S/N ratio is limited to part of a luminance range and a sufficient effect cannot be obtained.

SUMMARY

According to an aspect of the disclosure, an image capture apparatus includes a photoelectric conversion unit, an acquisition unit, a first amplification unit, a second amplification unit, and an amplification factor control unit. The photoelectric conversion unit is configured to convert an optical image into an image signal. The acquisition unit is configured to acquire a value related to a correct exposure on a basis of the image signal converted from the optical image by the photoelectric conversion unit. The first amplification unit is configured to amplify the image signal with a first amplification factor. The second amplification unit is configured to amplify the image signal with a second amplification factor. The amplification factor control unit is configured to change the first amplification factor or the second amplification factor based on the value related to the correct exposure.

Further features of the disclosure will become apparent from the following description of exemplary embodiments with reference to the attached drawings.

BRIEF DESCRIPTION OF THE DRAWINGS

FIG. 7 is a diagram illustrating a table of correspondence relation.

DESCRIPTION OF THE EMBODIMENTS

Hereinafter, the disclosure will be described in detail on the basis of exemplary embodiments with reference to the accompanying drawings. Configurations illustrated in the following exemplary embodiments are merely examples, and the disclosure is not necessarily limited to the illustrated configurations.

Figure 1:
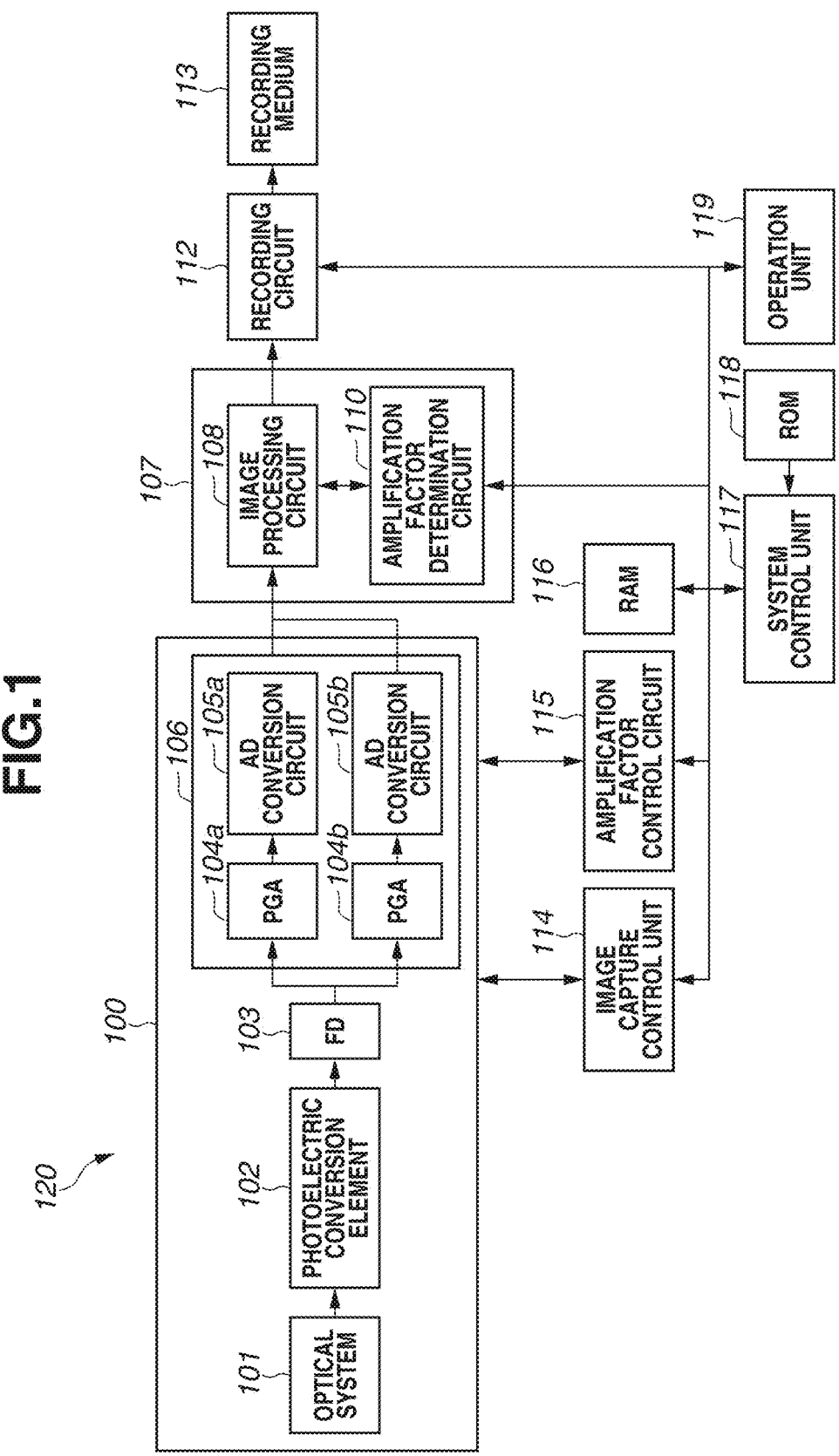
FIG. 1 is a block diagram illustrating a configuration example of an image capture apparatus according to a first exemplary embodiment.

FIG. 1 is a diagram illustrating a configuration example of an image capture apparatus 120 according to a first exemplary embodiment. The image capture apparatus 120 includes an image capturing device 100, a digital signal processing circuit 107, a recording circuit 112, a recording medium 113, an image capture control unit 114, an amplification factor control circuit 115, a random access memory (RAM) 116, a system control unit 117, a read only memory (ROM) 118, and an operation unit 119.

The image capturing device 100 includes an optical system 101, a photoelectric conversion element 102, a floating diffusion (FD) 103, and an analog signal processing circuit 106. The analog signal processing circuit 106 includes programmable gain amplifiers (PGAs) 104a and 104b, and analog to digital (AD) conversion circuits 105a and 105b. The digital signal processing circuit 107 includes an image processing circuit 108 and an amplification factor determination circuit 110.

The image capturing device 100 converts an optical image of a subject into an image. The optical system 101 includes a lens and a diaphragm. The photoelectric conversion element 102 converts the optical image of the subject into an electric charge. The FD 103 converts the electric charge obtained by the conversion by the photoelectric conversion element 102 into a voltage. The photoelectric conversion element 102 and the PD 103 constitute a photoelectric conversion unit that converts the optical image into an image signal (voltage).

The analog signal processing circuit 106 performs signal processing on the image signal obtained by the conversion by the FD 103. The PGA 104a is an amplification unit that amplifies the image signal obtained by the conversion by the FD 103 with an amplification factor Ga. The PGA 104b is an amplification unit that amplifies the image signal obtained by the conversion by the FD 103 with an amplification factor Gb. The AD conversion circuit 105a is an AD conversion unit that performs AD conversion on the image signal amplified by the PGA 104a and outputs an image. The AD conversion circuit 105b is an AD conversion unit that performs AD conversion on the image signal amplified by the PGA 104b and outputs an image.

The image processing circuit 108 is a combining unit that performs development processing and combining processing on the image output by the AD conversion circuit 105a and the image output by the AD conversion circuit 105b and outputs an image. The amplification factor determination circuit 110 determines a capacitance of the FD 103, the amplification factor Ga of the PGA 104a, and the amplification factor Gb of the PGA 104b on the basis of an instruction from a user. Details will be described below.

The recording circuit 112 records the image output from the image processing circuit 108 in the recording medium 113. The recording medium 113 is, for example, a memory card or a hard disk drive, and stores an image.

The system control unit 117 controls each component of the image capture apparatus 120. The ROM 118 is a non-volatile memory that stores a program executed by the system control unit 117 and control data such as a control parameter. The RAM 116 is a volatile memory used as a work area by the system control unit 117 performing the control.

The image capture control unit 114 controls the image capturing device 100 based on the control by the system control unit 117. The amplification factor control circuit 115 is an amplification factor control unit, and changes settings of the capacitance of the FD 103, the amplification factor Ga of the PGA 104a, and the amplification factor Gb of the PGA 104b to thereby control the amplification factor for the image signal (voltage). The operation unit 119 receives an instruction from the user or an externally connected device such as a release.

Figure 2:
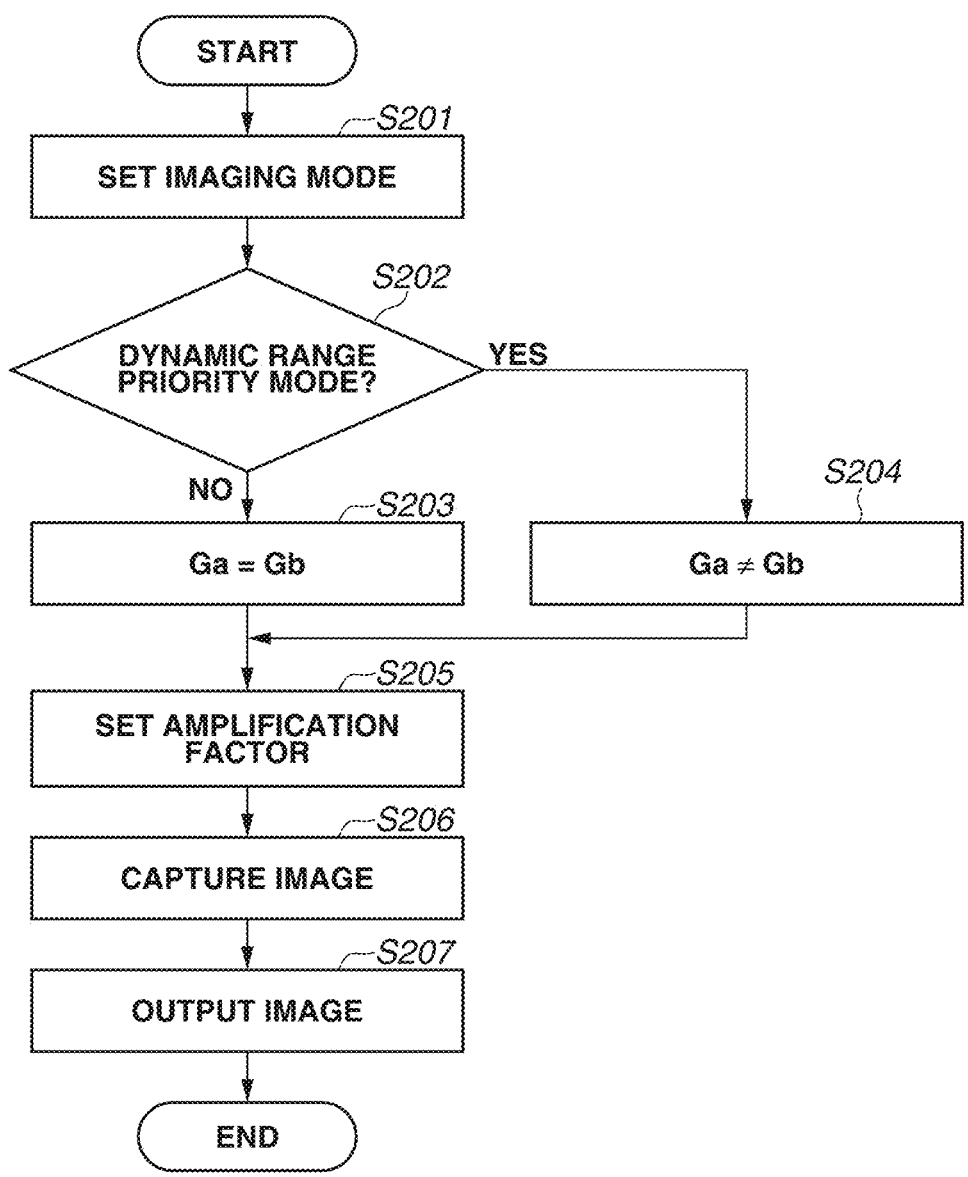
FIG. 2 is a flowchart illustrating a control method for the image capture apparatus according to the first exemplary embodiment.

FIG. 2 is a flowchart illustrating a control method for the image capture apparatus 120 according to the first exemplary embodiment. First, in step S201, the system control unit 117 sets an imaging mode based on the operation performed on the operation unit 119. For example, the system control unit 117 sets a dynamic range priority mode or a low noise priority mode as the imaging mode based on a user operation performed on the operation unit 119.

Next, in step S202, the system control unit 117 determines whether the imaging mode set in step S201 is the dynamic range priority mode. If the system control unit 117 determines that the imaging mode is the dynamic range priority mode (YES in step S202), the processing proceeds to step S204. If the imaging mode is not the dynamic range priority mode (NO in step S202), the processing proceeds to step S203.

In step S203, the amplification factor determination circuit 110 determines the capacitance of the FD 103, the amplification factor Ga of the PGA 104a, and the amplification factor Gb of the PGA 104b. More specifically, the amplification factor determination circuit 110 determines the amplification factor Ga of the PGA 104a and the amplification factor Gb of the PGA 104b in such a manner that the amplification factor Ga of the PGA 104a and the amplification factor Gb of the PGA 104b are the same. For example, if the amplification factor Ga that can be set on the PGA 104a and the amplification factor Gb that can be set on the PGA 104b are each "1", "2", "4" or "8", the amplification factor determination circuit 110 determines both the amplification factor Ga of the PGA 104a and the amplification factor Gb of the PGA 104b to be "4". Subsequently, the processing proceeds to step S205.

In step S204, the amplification factor determination circuit 110 determines the capacitance of the FD 103, the amplification factor Ga of the PGA 104a, and the amplification factor Gb of the PGA 104b. More specifically, the amplification factor determination circuit 110 determines the amplification factor Ga of the PGA 104a and the amplification factor Gb of the PGA 104b in such a manner that the amplification factor Ga of the PGA 104a and the amplification factor Gb of the PGA 104b are different. For example, if the amplification factor Ga that can be set on the PGA 104a and the amplification factor Gb that can be set on the PGA 104b are each "1", "2", "4" or "8", the amplification factor determination circuit 110 determines the amplification factor Ga of the PGA 104a to be "1" and the amplification factor Gb of the PGA 104b to be "8". Subsequently, the processing proceeds to step S205.

In step S205, the amplification factor control circuit 115 sets, to the image capturing device 100, the capacitance of the FD 103, the amplification factor Ga of the PGA 104a, and the amplification factor Gb of the PGA 104b on the basis of the capacitance and the amplification factors Ga and Gb determined in step S203 or S204. The amplification factor control circuit 115 can change the setting of the amplification factor Ga or the amplification factor Gb.

Next, in step S206, the image capture control unit 114 causes the image capturing device 100 to start an imaging operation in response to the operation performed on the operation unit 119. First, the image capture control unit 114 drives the lens and diaphragm of the optical system 101 to form an optical image of a subject on the photoelectric conversion element 102. An exposure time of the photoelectric conversion element 102 is controlled by the image capture control unit 114. The photoelectric conversion element 102 converts the optical image into an electric charge, and transfers the electric charge to the PD 103. The FD 103 converts the electric charge into a voltage. The PGA 104a amplifies the voltage obtained by the conversion by the FD 103 with the amplification factor Ga. The PGA 104b amplifies the voltage obtained by the conversion by the PD 103 with the amplification factor Gb. The AD conversion circuit 105a performs AD conversion on the voltage amplified by the PGA 104a, and outputs an image. The AD conversion circuit 105b performs AD conversion on the voltage amplified by the PGA 104b, and outputs an image. The image processing circuit 108 performs development processing and then combining processing on the image output by the AD conversion circuit 105a and the image output by the AD conversion circuit 105b. The combining processing will be described below.

Next, in step S207, the image processing circuit 108 outputs a combining-processed image to the recording circuit 112. The recording circuit 112 converts the image into an image in a data format suitable for the recording medium 113, and records the image in the recording medium 113.

Here, the image combining processing performed in step S206 will be described. The image processing circuit 108 performs the combining processing by different methods for the amplification factors Ga and Gb.

If the amplification factors Ga and Gb are different, two images output by the AD conversion circuits 105a and 105b, respectively, have different dynamic ranges, and some luminance areas overlap. In such a case, with regard to a pixel where luminance ranges of the two images output by the AD conversion circuits 105a and 105b overlap, the image processing circuit 108 selects a pixel with good image quality from the two images output by the AD conversion circuits 105a and 105b. For example, the image processing circuit 108 selects a pixel of an image corresponding to a high amplification factor of the amplification factors Ga and Gb, as the pixel with good image quality. In addition, with regard to a bright pixel where the luminance ranges of the two images output by the AD conversion circuits 105a and 105b do not overlap, the image processing circuit 108 selects a pixel of an image corresponding to a low amplification factor of the amplification factors Ga and Gb. In the dynamic range priority mode, the image processing circuit 108 can generate an image with a wide dynamic range by combining the two images output by the AD conversion circuits 105a and 105b.

If the amplification factors Ga and Gb are the same, the image processing circuit 108 performs averaging processing on pixel values of pixels at the same position in the two images output by the AD conversion circuits 105a and 105b. In the low noise priority mode, the image processing circuit 108 performs the averaging processing to reduce the noise of an image, and thereby can obtain an image with an improved signal-to-noise (S/N) ratio.

In the first exemplary embodiment, the image capture apparatus 120 can generate an image where the dynamic range is prioritized or an image where an improvement of the S/N ratio is prioritized on the basis of the intention of the user.

Figure 3:
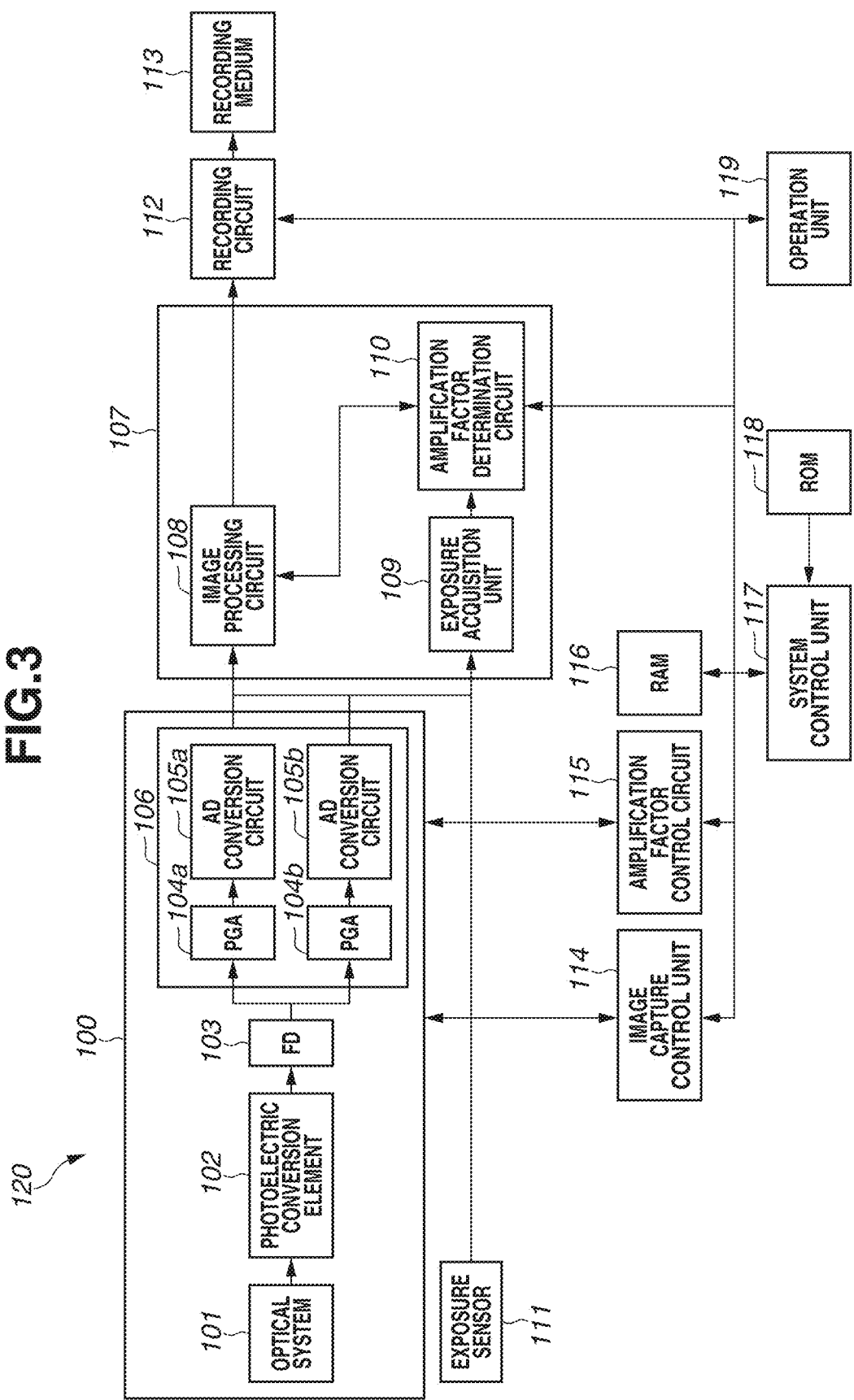
FIG. 3 is a block diagram illustrating a configuration example of an image capture apparatus according to a second exemplary embodiment.

FIG. 3 is a diagram illustrating a configuration example of an image capture apparatus 120 according to a second exemplary embodiment. The image capture apparatus 120 of FIG. 3 includes an exposure acquisition unit 109 and an exposure sensor 111, which are added to the image capture apparatus 120 of FIG. 1. The image capture apparatus 120 according to the present exemplary embodiment has a function to automatically perform exposure. Hereinafter, differences between the second exemplary embodiment and the first exemplary embodiment will be described.

The exposure sensor 111 is, for example, an image sensor such as a complementary metal oxide semiconductor (CMOS) sensor, and detects brightness (luminance) of an optical image of a subject on the basis of the pixel value. The exposure sensor 111 may be an image sensor having a smaller number of pixels than the number of pixels of the image sensor for imaging, but may have a larger number of pixels than the number of pixels of the image sensor for imaging. The exposure sensor 111 outputs luminance data (luminance distribution) of each pixel.

The exposure acquisition unit 109 acquires an exposure value (EV) of automatic exposure as a value related to a correct exposure on the basis of the luminance data output by the exposure sensor 111 or an image output by the image capturing device 100. The amplification factor determination circuit 110 determines the amplification factor Ga of the PGA 104a and the amplification factor Gb of the PGA 104b on the basis of the EV acquired by the exposure acquisition unit 109.

Figure 4:
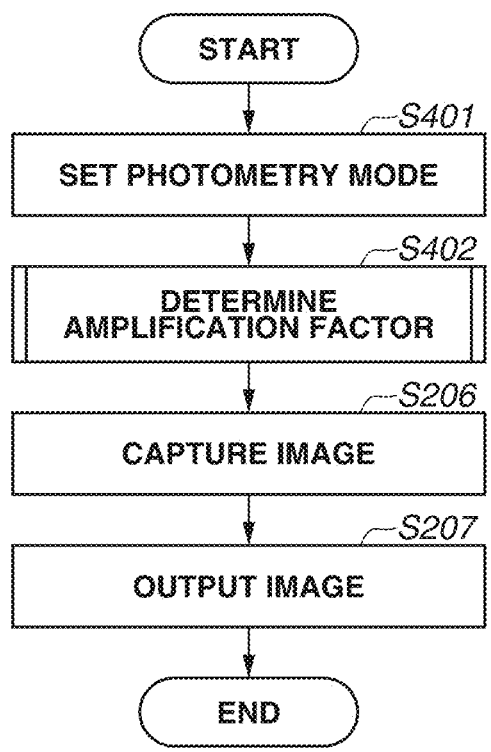
FIG. 4 is a flowchart illustrating a control method for the image capture apparatus according to the second exemplary embodiment.

FIG. 4 is a flowchart illustrating a control method for the image capture apparatus 120 according to the second exemplary embodiment. First, in step S401, the system control unit 117 sets a photometry mode of the image capturing device 100 and a photometry mode of the exposure sensor 111 in response to a user operation performed on the operation unit 119. The photometry mode includes a center-weighted photometry mode, an evaluation photometry mode, and a spot photometry mode.

Figure 5:
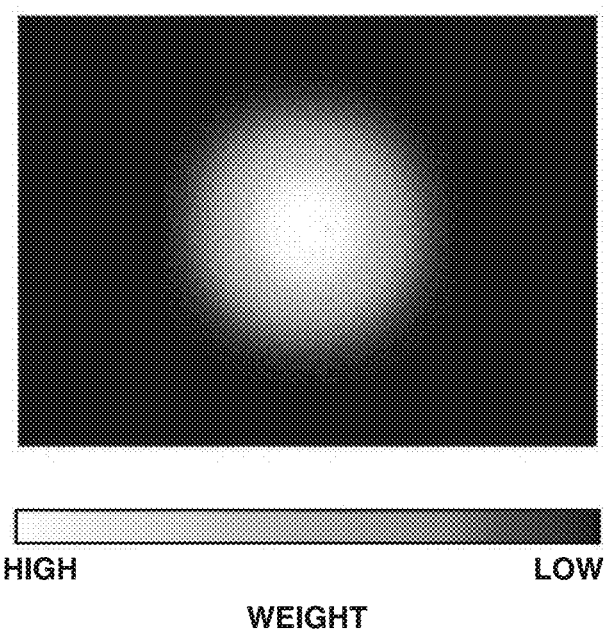
FIG. 5 is a diagram illustrating weight of brightness.

As illustrated in FIG. 5, the center-weighted photometry mode is a mode where the brightness of the image is calculated in such a manner that the weight of brightness (luminance) is maximized at the center of the image and the weight of brightness is reduced as it gets farther away from the center. The evaluation photometry mode is a mode where the brightness of the entire image is averaged to calculate the brightness of the image. The spot photometry mode is a mode where the weight of a specific area such as a focus point is increased to calculate the brightness of the image.

For example, the system control unit 117 sets the photometry mode of the image capturing device 100 to the center-weighted photometry mode and sets the photometry mode of the exposure sensor 111 to the evaluation photometry mode.

Next, in step S402, when a shutter button of the operation unit 119 is half pressed, the system control unit 117 instructs the image capturing device 100 to perform pre-imaging. The pre-imaging is performed immediately before imaging in step S206 described below. The amplification factor determination circuit 110 determines the capacitance of the FD 103, the amplification factor Ga of the PGA 104a, and the amplification factor Gb of the PGA 104b on the basis of the pre-imaging. The amplification factor control circuit 115 sets, to the image capturing device 100, the capacitance of the FD 103, the amplification factor Ga of the PGA 104a, and the amplification factor Gb of the PGA 104b, on the basis of the capacitance of the FD 103, the amplification factor Ga, and the amplification factor Gb determined by the amplification factor determination circuit 110. Details of step S402 will be described below with reference to FIG. 6.

Next, in step S206, when the shutter button of the operation unit 119 is fully pressed, the image capture apparatus 120 performs the same processing as the processing in step S206 of FIG. 2. Then, in step S207, the image capture apparatus 120 performs the same processing as the processing in step S207 of FIG. 2.

Figure 6:
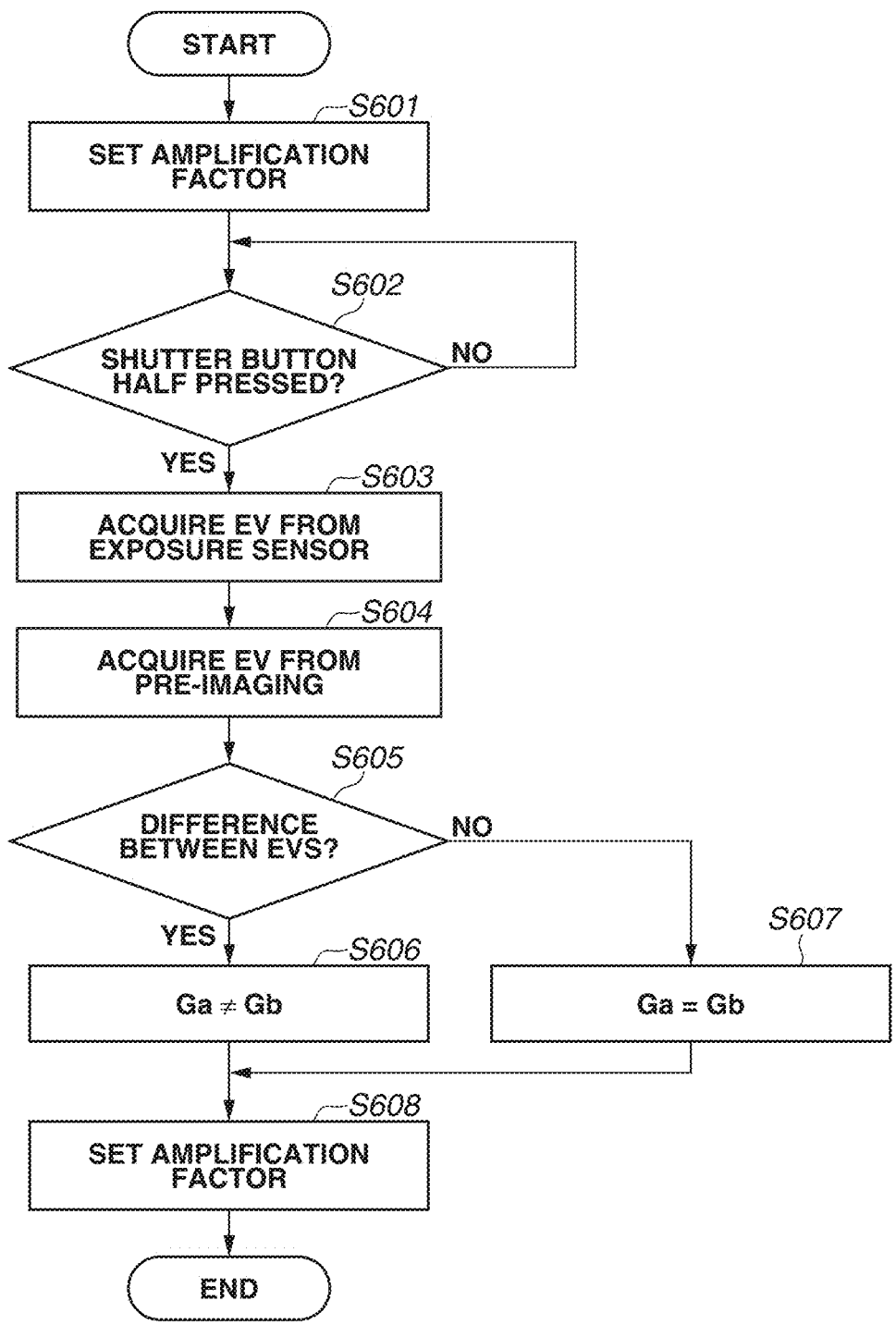
FIG. 6 is a flowchart illustrating a method for determining an amplification factor.

FIG. 6 is a flowchart illustrating the details of step S402 of FIG. 4. First, in step S601, the amplification factor control circuit 115 sets, to the image capturing device 100, an initial value of the capacitance of the FD 103, an initial value of the amplification factor Ga of the PGA 104a, and an initial value of the amplification factor Gb of the PGA 104b. For example, the amplification factor Ga that can be set on the PGA 104a and the amplification factor Gb that can be set on the PGA 104b are each "1", "2", "4" or "8". In such a case, the amplification factor control circuit 115 sets "2" as initial values of both the amplification factor Ga of the PGA 104a and the amplification factor Gb of the PGA 104b.

Next, in step S602, the system control unit 117 waits until the shutter button of the operation unit 119 is half pressed. If the shutter button of the operation unit 119 is half pressed (YES in step S602), the processing proceeds to step S603.

Next, in step S603, the exposure acquisition unit 109 acquires the EV of automatic exposure with the use of the luminance data output by the exposure sensor 111 on the basis of the photometry mode of the exposure sensor 111 set in step S401. Since the photometry mode of the exposure sensor 111 is set to the evaluation photometry mode, the exposure acquisition unit 109 acquires the EV on the basis of the average value of the luminance data of each pixel output by the exposure sensor 111. The exposure acquisition unit 109 holds a table 700 illustrated in FIG. 7. The table 700 indicates a correspondence relation among an average value 701 of the luminance data, an EV 702, and an amplification factor 703. The exposure acquisition unit 109 refers to the table 700 and acquires the EV 702 on the basis of the average value 701 of the luminance data of each pixel output by the exposure sensor 111. The EV 702 is an exposure value obtained by performing photometry on the optical image in the evaluation photometry mode.

Next, in step S604, the image capture control unit 114 causes the image capturing device 100 to start pre-imaging. The image capturing device 100 outputs the image output by the AD conversion circuit 105a and/or 105b as red-greenblue (RGB) data. The RGB data is the data regarding red (R), green (G), and blue (B). The exposure acquisition unit 109 acquires the EV of automatic exposure with the use of the RGB data about image output by the image capturing device 100 on the basis of the photometry mode of the exposure sensor 111 set in step S401. Since the photometry mode of the image capturing device 100 is set to the center-weighted photometry mode, the exposure acquisition unit 109 first calculates luminance data Y of each pixel of the image output by the image capturing device 100 from the RGB data about the relevant pixel using the following formula. In the formula, R represents red data in the RGB data, G represents green data in the RGB data, and B represents blue data in the RGB data. The method for calculating the luminance data Y is not limited to the following formula.

$$Y=0.2126 \times R + 0.587 \times G + 0.114 \times B$$

Next, the exposure acquisition unit 109 multiplies the luminance data Y of each pixel by the weight illustrated in FIG. 5, refers to the table 700 in FIG. 7, and acquires the EV 702 from the average value 701 of multiplication results. This EV 702 is an exposure value obtained by performing photometry on the optical image in the center-weighted photometry mode.

Next, in step S605, the amplification factor determination circuit 110 determines whether there is a difference between the EV of the exposure sensor 111 acquired in step S603 and the EV of the image capturing device 100 acquired in step S604. If the amplification factor determination circuit 110 determines that there is a difference between the EVs (YES in step S605), the processing proceeds to step S606. If the amplification factor determination circuit 110 determines that there is no difference between the EVs (NO in step S605), the processing proceeds to step S607. In other words, if the amplification factor determination circuit 110 determines that the EVs acquired in steps S603 and S604 are different, the processing proceeds to step S606. If the amplification factor determination circuit 110 determines that the EVs acquired in steps S603 and S604 are the same, the processing proceeds to step S607.

Figure 8:
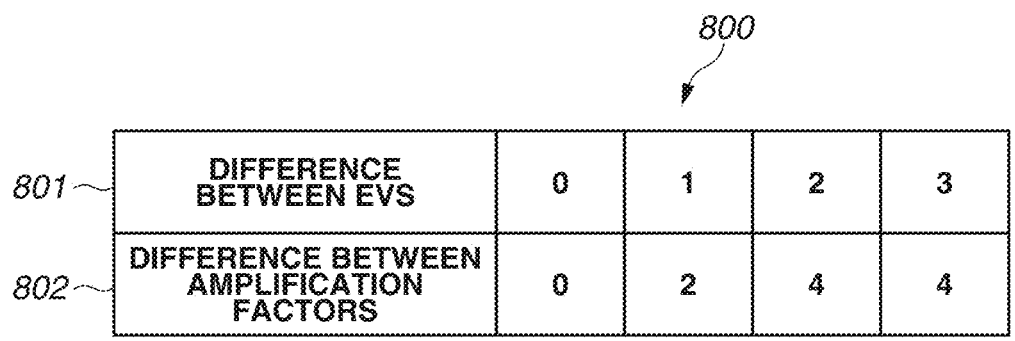
FIG. 8 is a diagram illustrating another table of correspondence relation.

In step S606, the amplification factor determination circuit 110 determines the capacitance of the FD 103, the amplification factor Ga of the PGA 104a, and the amplification factor Gb of the PGA 104b. More specifically, the amplification factor determination circuit 110 determines the amplification factor Ga of the PGA 104a and the amplification factor Gb of the PGA 104b in such a manner that the amplification factor Ga of the PGA 104a and the amplification factor Gb of the PGA 104b are different. For example, the amplification factor determination circuit 110 holds a table 800 illustrated in FIG. 8. The table 800 indicates a correspondence relation between a difference 801 between EVs and a difference 802 between amplification factors. The difference 801 between EVs is the difference between the EV acquired in step S603 and the EV acquired in step S604. The difference 802 between amplification factors is the difference between the amplification factors Ga and Gb. The amplification factor determination circuit 110 refers to the table 800 and acquires the difference 802 between amplification factors on the basis of the difference 801 between the EV acquired in step S603 and the EV acquired in step S604. The amplification factor determination circuit 110 determines the amplification factor Ga of the PGA 104a and the amplification factor Gb of the PGA 104b in such a manner that the difference between the amplification factors Ga and Gb is the difference 802 between amplification factors.

For example, the amplification factor determination circuit 110 determines the initial value of the amplification factor Ga of step S601 as the amplification factor Ga of the PGA 104a. In addition, the amplification factor determination circuit 110 determines, as the amplification factor Gb of the PGA 104b, an amplification factor obtained by multiplying the initial value of the amplification factor Gb of step S601 by the difference 802 between amplification factors. If the amplification factor Gb exceeds a maximum value that can be set as a result of multiplication, the amplification factor determination circuit 110 determines the maximum value that can be set as the amplification factor Gb of the PGA 104b. Subsequently, the processing proceeds to step S608.

In step S607, the amplification factor determination circuit 110 determines the capacitance of the FD 103, the amplification factor Ga of the PGA 104a, and the amplification factor Gb of the PGA 104b. More specifically, the amplification factor determination circuit 110 determines the amplification factor Ga of the PGA 104a and the amplification factor Gb of the PGA 104b in such a manner that the amplification factor Ga of the PGA 104a and the amplification factor Gb of the PGA 104b are the same. For example, the amplification factor determination circuit 110 determines the amplification factors Ga and Gb having the same value on the basis of the EV of the exposure sensor 111 acquired in step S603. Subsequently, the processing proceeds to step S608.

In step S608, the amplification factor control circuit 115 sets, to the image capturing device 100, the capacitance of the FD 103, the amplification factor Ga of the PGA 104a, and the amplification factor Gb of the PGA 104b on the basis of the capacitance, the amplification factor Ga, and the amplification factor Gb determined in step S606 or S607.

In step S206 of FIG. 4, if the amplification factors Ga and Gb are different, the image processing circuit 108 can generate an image with a wide dynamic range by combining the two images output by the AD conversion circuits 105a and 105b. If the amplification factors Ga and Gb are the same, the image processing circuit 108 performs the averaging processing on the two images output by the AD conversion circuits 105a and 105b to reduce the noise of the images, and thereby can obtain an image with an improved S/N ratio. The image capture apparatus 120 can generate an image with a high S/N ratio of a main subject on the basis of the intention of the user.

In the second exemplary embodiment, an image capture apparatus having a function to perform automatic exposure has been described as an example, while the image capture apparatus does not necessarily need to have an automatic exposure function. The same effect as in the second exemplary embodiment can be exhibited as long as the image capture apparatus can acquire a correct exposure on the basis of at least the luminance of a scene.

Each of the above-described exemplary embodiments is merely an example of an embodiment in carrying out the disclosure, and the technical scope of the disclosure should not be limitedly interpreted by these. The disclosure can be implemented in various forms without departing from the technical idea or main features thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-137960, filed Jul. 26, 2019, which is hereby incorporated by reference herein in its entirety.

What is claimed is:

1. An image capture apparatus comprising:
a photoelectric conversion unit configured to convert an optical image into an image signal;
an acquisition unit configured to acquire a value related to an exposure on a basis of the image signal converted from the optical image by the photoelectric conversion unit;
a first amplification unit configured to amplify the image signal with a first amplification factor;
a second amplification unit configured to amplify the image signal with a second amplification factor; and
an amplification factor control unit configured to change the first amplification factor or the second amplification factor based on the value related to the exposure,
wherein the amplification factor control unit sets the first amplification factor and the second amplification factor so that, in a first case, the first amplification factor and the second amplification factor are different from each other and, in a second case, the first amplification factor and the second amplification factor are identical to each other.

2. The image capture apparatus according to claim 1, further comprising:
a first analog to digital conversion unit configured to perform analog to digital conversion on the image signal amplified by the first amplification unit; and
a second analog to digital conversion unit configured to perform analog to digital conversion on the image signal amplified by the second amplification unit.

3. The image capture apparatus according to claim 2, further comprising a combining unit configured to combine a first digital image signal resulting from the analog to digital conversion performed by the first analog to digital conversion unit and a second digital image signal resulting from the analog to digital conversion performed by the second analog to digital conversion unit.

4. The image capture apparatus according to claim 1, wherein the amplification factor control unit changes the first amplification factor or the second amplification factor based on an imaging mode or the optical image.

5. The image capture apparatus according to claim 3, wherein the combining unit combines, in the first case, the first digital image signal and the second digital image signal and averages, in the second case, the first digital image signal and the second digital image signal.

6. The image capture apparatus according to claim 1, wherein the amplification factor control unit sets the first amplification factor and the second amplification factor so that, in a first imaging mode, the first amplification factor and the second amplification factor are different from each other and, in a second imaging mode, the first amplification factor and the second amplification factor are identical to each other.

7. The image capture apparatus according to claim 3, wherein the amplification factor control unit sets the first amplification factor and the second amplification factor so that, in a first imaging mode, the first amplification factor and the second amplification factor are different from each other and, in a second imaging mode, the first amplification factor and the second amplification factor are identical to each other, and
wherein the combining unit combines, in the first imaging mode, the first digital image signal and the second digital image signal and averages, in the second imaging mode, the first digital image signal and the second digital image signal.

8. The image capture apparatus according to claim 1, wherein the amplification factor control unit changes the first amplification factor or the second amplification factor based on an exposure value obtained by performing photometry on the optical image in a first photometry mode and an exposure value obtained by performing photometry on the optical image in a second photometry mode.

9. The image capture apparatus according to claim 8, wherein the amplification factor control unit sets the first amplification factor and the second amplification factor so that the first amplification factor and the second amplification factor are different from each other in a case where the exposure value obtained by performing photometry on the optical image in the first photometry mode and the exposure value obtained by performing photometry on the optical image in the second photometry mode are different from each other, and
wherein the amplification factor control unit sets the first amplification factor and the second amplification factor so that the first amplification factor and the second amplification factor are identical to each other in a case where the exposure value obtained by performing photometry on the optical image in the first photometry mode and the exposure value obtained by performing photometry on the optical image in the second photometry mode are identical to each other.

10. The image capture apparatus according to claim 3, wherein the amplification factor control unit sets the first amplification factor and the second amplification factor so that the first amplification factor and the second amplification factor are different from each other in a case where an exposure value obtained by performing photometry on the optical image in a first photometry mode and an exposure value obtained by performing photometry on the optical image in a second photometry mode are different from each other,
wherein the amplification factor control unit sets the first amplification factor and the second amplification factor so that the first amplification factor and the second amplification factor are identical to each other in a case where the exposure value obtained by performing photometry on the optical image in the first photometry mode and the exposure value obtained by performing photometry on the optical image in the second photometry mode are identical to each other,
wherein the combining unit combines the first digital image signal and the second digital image signal in a case where the exposure value obtained by performing photometry on the optical image in the first photometry mode and the exposure value obtained by performing photometry on the optical image in the second photometry mode are different from each other, and
wherein the combining unit averages the first digital image signal and the second digital image signal in a case where the exposure value obtained by performing photometry on the optical image in the first photometry mode and the exposure value obtained by performing photometry on the optical image in the second photometry mode are identical to each other.

11. The image capture apparatus according to claim 9, further comprising:
a sensor configured to detect luminance of the optical image; and
an acquisition unit configured to acquire the exposure value obtained by performing photometry in the first photometry mode on a basis of the luminance detected by the sensor, and acquire the exposure value obtained by performing photometry in the second photometry mode on a basis of the image signal obtained by the conversion by the photoelectric conversion unit.

12. The image capture apparatus according to claim 9, wherein the amplification factor control unit sets the first amplification factor and the second amplification factor so that the first amplification factor and the second amplification factor are different from each other on a basis of a difference between the exposure value obtained by performing photometry on the optical image in the first photometry mode and the exposure value obtained by performing photometry on the optical image in the second photometry mode in a case where the exposure value obtained by performing photometry in the first photometry mode and the exposure value obtained by performing photometry in the second photometry mode are different from each other.

13. A control method for an image capture apparatus, the control method comprising:
converting an optical image into an image signal;
acquiring a value related to an exposure on a basis of the image signal obtained in the converting;
amplifying the image signal with a first amplification factor and amplifying the image signal with a second amplification factor; and
changing the first amplification factor or the second amplification factor on a basis of the value related to the exposure,
wherein the first amplification factor and the second amplification factor are set so that, in a first case, the first amplification factor and the second amplification factor are different from each other and, in a second case, the first amplification factor and the second amplification factor are identical to each other.

14. The control method according to claim 13, further comprising:
performing analog to digital conversion on the image signal having been amplified with the first amplification factor to obtain a first digital image signal; and
performing analog to digital conversion on the image signal having been amplified with the second amplification factor to obtain a second digital image signal.

15. The control method according to claim 14, further comprising combining the first digital image signal and the second digital image signal.

16. The control method according to claim 13, wherein the first amplification factor or the second amplification factor is changed based on an imaging mode or the optical image.

17. The control method according to claim 15, wherein the first digital image signal and the second digital image signal are combined in the first case and the first digital image signal and the second digital image signal are averaged in the second case.

18. The control method according to claim 13, wherein the first amplification factor and the second amplification factor are set so that, in a first imaging mode, the first amplification factor and the second amplification factor are different from each other and, in a second imaging mode, the first amplification factor and the second amplification factor are identical to each other.

* * * * *